Aug. 23, 1932.        V. BENDIX        1,872,872
SUPPORT
Filed Sept. 13, 1928

INVENTOR.
Vincent Bendix
BY
M. W. McConkey
ATTORNEY

Patented Aug. 23, 1932

1,872,872

UNITED STATES PATENT OFFICE

VINCENT BENDIX, OF CHICAGO, ILLINOIS, ASSIGNOR TO BENDIX BRAKE COMPANY, OF SOUTH BEND, INDIANA, A CORPORATION OF ILLINOIS

SUPPORT

Application filed September 13, 1928. Serial No. 305,828.

This invention relates to supports for brake operating shafts and the like and is illustrated as embodied in a novel spring support for the chassis end of the operating shaft of a front brake for an automobile.

An object of the invention is to provide a simple and inexpensive support for such a shaft which will permit it to have a universal movement to compensate for relative movement of the axle and chassis frame due to the action of the vehicle springs, and preferably also to arrange the support to serve as an auxiliary return spring which must be overcome in applying the brake.

Preferably the support includes a member formed of spring wire having laterally extending portions, preferably the ends of the wire, which are secured to the chassis frame and which form in effect spring arms permitting the support to move bodily a short distance toward and from the frame so that the shaft can move endwise, and which has another portion wound as a helix forming a generally cylindrical bearing which receives the shaft end. Preferably this helix is keyed or pinned to the shaft so that it is distorted by angular movement of the shaft and thus serves as an auxiliary return spring resisting brake applying movement of the shaft.

The above and other objects and features of the invention, including various novel combinations of parts and desirable particular constructions, will be apparent from the following description of the illustrative embodiments shown in the accompanying drawing, in which.

Figure 1:
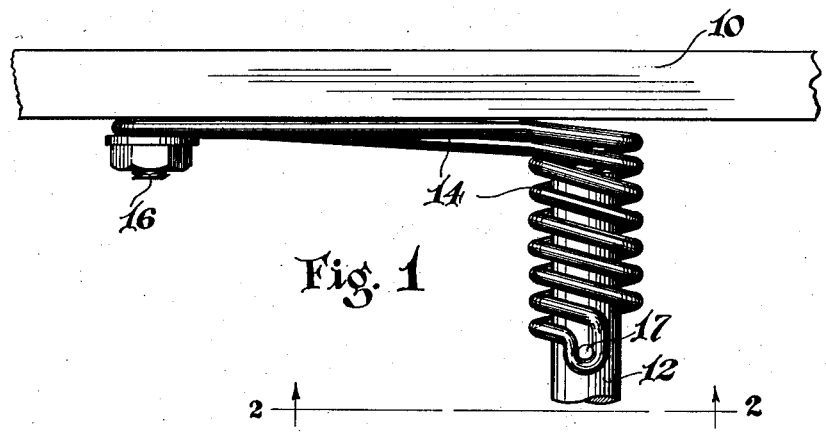
Figure 1 is a top plan view of part of the chassis frame and the adjacent end of the shaft, together with one form of shaft support.

In the various arrangements shown the chassis frame of the automobile is designated by reference character 10 and the adjacent end of the operating shaft for one of the front wheel brakes is designated 12. This shaft must be supported in a manner permitting it to have universal movement but at the same time holding it firmly against bodily rearward movement which might cause undue loss of pedal travel in applying the brake.

Figure 2:
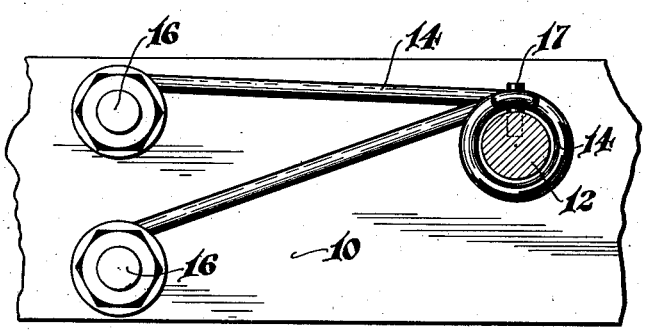
Figure 2 is a side elevation of the parts shown in Figure 1 and looking in the direction of the arrows 2—2 in Figure 1.

In the arrangement of Figures 1 and 2 the novel support includes a member 14 formed of spring wire having its ends extended toward the front of the automobile and formed with eyes mounted on bolts 16 secured to the frame 10. The intermediate portion of the spring wire member 14 is wound as a helix embracing the end of the shaft 12 and forming a cylindrical bearing for the shaft end and which terminates in a loop embracing a pin 17 fixed in the shaft and which serves to pin the spring helix to the shaft, to serve the additional function of an auxiliary return spring resisting brake applying angular movement to the shaft. It will be seen that this forms a very inexpensive support for the shaft and one which permits the shaft to move endwise and also to have a universal movement about its end, but which at the same time supports the shaft for angular movement about its axis to apply the brake and holds it against bodily movement crosswise of its axis which would unnecessarily take up part of the pedal travel in applying the brake.

Figures 3, 4:
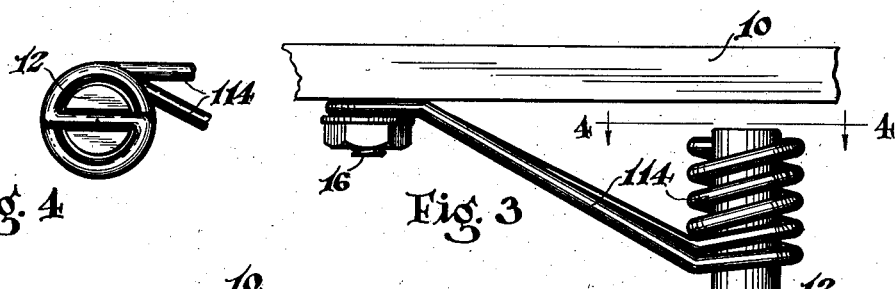
Figure 3 is a view corresponding to Figure 1 but showing a modified form of shaft support.
Figure 4 is an end elevation of the shaft and a portion of the support shown in Figure 3 and looking in the direction of the arrows 4—4 of Figure 3.

In the arrangement of Figures 1 and 2 the helix wound from the spring member 14 extends outwardly from the bolted ends. In Figures 3 and 4 the arrangement is generally the same except that the spring wire member 114 corresponding to the member 14 of Figures 1 and 2 has the helix wound in a direction extending toward the chassis frame 10, the laterally projecting ends being offset to permit of this arrangement. In this case the last coil of the helix extends along the diameter of the helix through a slot formed in the end of the shaft 12 thus keying the shaft to the support.

Figure 5:
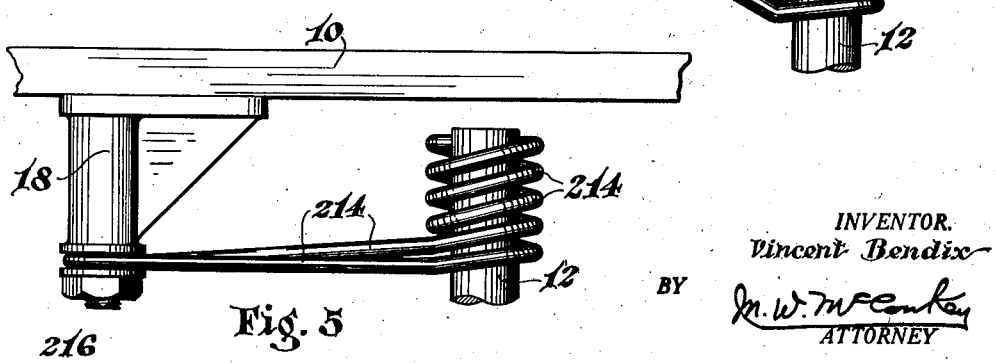
Figure 5 is a view corresponding to Figures 1 and 3 but showing a third form of support.

The arrangement of Figure 5 is the same as that of Figure 3 except that the spring member 214 has its laterally projecting ends extending substantially parallel to the chassis frame 10 and the bolts 216 which hold these ends are carried by brackets 18 projecting on and secured to the chassis frame 10.

In all the forms of the invention the laterally projecting ends of the support are preferably bent at such an angle that when the device is in place, as shown in the drawing, the support yieldingly urges the shaft 12 endwise. In the arrangement of Figures 1 and 2 the shaft is urged toward the chassis frame 10 while in the arrangements of Figures 3 to 5 the shaft is urged yieldingly away from the chassis frame 10. In either case this places a spring load on the shaft and on the joint at the brake end of the shaft, which minimizes wear and obviates possible rattle.

While several illustrative embodiments have been described in detail, it is not my intention to limit the scope of the invention to those particular embodiments or otherwise than by the terms of the appended claims.

I claim:

1. A shaft support formed of wirelike material and having its ends projecting laterally to be secured to a supporting member and having its intermediate portion formed as a shaft-embracing helix, together with means for securing at least one part of said helix to the shaft so that the helix resists angular movement of the shaft.

2. A shaft support of wirelike spring material having a shaft-embracing helix and laterally projecting ends offset in the direction of the axis of the helix beyond the end of the helix.

3. A shaft support of wirelike spring material having a shaft-embracing helix and laterally projecting ends, the end coil of the helix extending diametrically of the helix to be seated in a slot in the end of a shaft embraced by the helix.

4. A shaft support having a shaft-embracing helix and laterally projecting ends, the end of the helix being formed as a loop adapted to embrace a pin projecting radially from a shaft embraced by the helix.

5. Operating mechanism comprising a frame member and an adjacent shaft, in combination with helix, means comprising a helix secured to the frame member for supporting the end of the shaft for universal movement of the shaft and for resiliently resisting movement of the shaft about its axis.

6. Operating mechanism for a brake comprising a frame member and an adjacent shaft, in combination with a resilient support including a helix embracing the shaft and having laterally extending ends secured to the frame member.

7. Operating mechanism comprising a frame member and an adjacent shaft in combination with a helix secured to the frame member and embracing the end of the shaft in such manner as to permit universal movement thereof.

8. A shaft support comprising a duplex helix formed from a single strand having its ends extending tangentially from one end of the helix.

9. A shaft support comprising a duplex helix formed from a single strand with each convolution of the helix having the same pitch diameter and having the ends of the strand extending tangentially from one end of the helix.

10. A shaft support comprising a duplex helix formed from a single strand bent upon itself and having its ends extending tangentially from one end of the helix.

In testimony whereof, I have hereunto signed my name.

VINCENT BENDIX.